United States Patent
Ng et al.

(10) Patent No.: US 6,396,718 B1
(45) Date of Patent: May 28, 2002

(54) SWITCH MODE POWER SUPPLY USING TRANSFORMER FLUX SENSING FOR DUTY CYCLE CONTROL

(75) Inventors: Hector Chi Man Ng, Singapore; Eddie Chiu Keung Suen; Chew Ming Hian, both of Yishun, all of (SG)

(73) Assignee: Semiconductor Components Industries LLC, Phoenix, AZ (US)

( * ) Notice: Subject to any disclaimer, the term of this patent is extended or adjusted under 35 U.S.C. 154(b) by 0 days.

(21) Appl. No.: 09/739,602

(22) Filed: Dec. 19, 2000

(51) Int. Cl.[7] .................. H02M 3/335; H02M 1/12; H02M 1/14
(52) U.S. Cl. ............... 363/21.07; 363/21.1; 363/21.15; 363/21.18; 363/41
(58) Field of Search .................. 363/21.07, 21.08, 363/21.09, 21.1, 21.15, 21.16, 21.17, 21.18, 41, 97, 131

(56) References Cited

U.S. PATENT DOCUMENTS

| | | | | |
|---|---|---|---|---|
| 5,301,095 A | * | 4/1994 | Teramoto et al. | 363/21.07 |
| 5,313,381 A | * | 5/1994 | Balakrishman | 363/147 |
| 5,408,402 A | * | 4/1995 | Nonnenmacher | 363/21.09 |
| 5,701,238 A | * | 12/1997 | Weidinger et al. | 363/21.07 |
| 5,949,661 A | * | 9/1999 | Minkkinen | 363/21.07 |
| 5,959,851 A | | 9/1999 | Shutts | 363/56 |
| 6,091,616 A1 | * | 6/2001 | Jacobs et al. | 363/127 |
| 6,243,278 B1 | * | 6/2001 | Jacobs | 363/127 |

OTHER PUBLICATIONS

"Unitrode Low Power Pulse Width Modulator", Unitrode Application Information, pp. 3–94 to 3–99, Mar. 1997.

* cited by examiner

Primary Examiner—Bao Q. Vu

(57) ABSTRACT

A switch mode power supply (200, FIG. 2; 600, FIG. 6) includes a transformer (208), a transistor (212) that drives the primary winding of the transformer, and a controller (210, 610). The controller senses whether or not the transformer is reset and applies a switching control signal to a control terminal (220) of the transistor, accordingly. The signal is produced at a switching frequency, and the signal has a duty cycle that is limited based on whether or not the transformer is reset.

15 Claims, 12 Drawing Sheets

SWITCH MODE POWER SUPPLY USING TRANSFORMER FLUX SENSING FOR DUTY CYCLE CONTROL

FIELD OF THE INVENTION

The present invention relates generally to switch mode power supplies (SMPS) and, more particularly, to forward mode SMPS that use transformer saturation sensing to control the maximum duty cycle of the SMPS switching elements.

BACKGROUND OF THE INVENTION

Switch mode power supplies (SMPS) are commonly used to provide DC power to integrated circuits. FIG. 1 illustrates an SMPS 100 in accordance with the prior art. SMPS 100 is coupled to an AC input voltage source 102, and includes a full-wave rectifier 104, bulk capacitor 106, output transformer 108, power supply controller 110, a switch (e.g., a high-power transistor 112, such as a MOSFET), and secondary circuit 114 that includes a filter capacitor 130.

Voltage source 102 provides an input AC voltage between low line and high line values (e.g., between 90 Vac and 264 Vac). Rectifier 104 rectifies the input AC voltage. The output of rectifier 104 is smoothed by bulk capacitor 106, and the resulting input voltage is applied to the primary winding of transformer 108. Bulk capacitor 106 also enables SMPS 100 to maintain the output voltage, VOUT, within regulation for a minimum period of time after the AC power is switched off to SMPS 100. This minimum period of time is commonly referred to as the "hold up time."

Transistor 112 is used as a power switch, which is controlled by controller 110. Controller 110 includes a pulse width modulator 116 (PWM), which is driven by a clock 118. A pulse width modulated signal produced by PWM 116 activates and deactivates transistor 112 in response to power supply loading and other control parameters.

Regulation of VOUT is accomplished by varying the on-to-off duty cycle of transistor 112. Essentially, VOUT can be increased or decreased by increasing or decreasing, respectively, the duty cycle of the pulse width modulated signal provided by controller 110.

During steady state operations, when the load applied to the SMPS remains the same, the decrease in the transformer flux when transistor 112 is off must equal the increase in flux when the transistor 112 is on. Otherwise a net change in flux per cycle will occur, and the flux will continue to build up to saturation. Accordingly, if the duty cycle of the pulse width modulated signal is too long, transformer 108 will become saturated. Saturation increases the risk that the power transistor 112 will be damaged by high currents. Therefore, it is desirable to maintain the transformer operation within the transformer's non-saturation region.

During transient state operations, when the load applied to the SMPS suddenly increases, a longer duty cycle is required to provide the energy necessary to maintain a constant VOUT. This longer duty cycle during transient state operations also must be limited to avoid transformer saturation.

Some prior art systems attempt to avoid transformer saturation by setting a fixed, maximum duty cycle that will avoid saturation during both steady state and transient state operations. Unfortunately, however, these prior art systems have relatively high transistor conduction losses, and require a large bulk capacitor (e.g., capacitor 106) to meet hold up time requirements during power off.

What is needed is an SMPS that efficiently avoids transformer saturation and its associated transistor damage during both steady state and transient state operations. Further needed is an SMPS having a lower transistor conduction loss, and a relatively small bulk capacitor.

DETAILED DESCRIPTION OF THE DRAWINGS

The various embodiments of the present invention provide a switch mode power supply (SMPS) that avoids transformer saturation and transistor damage. In addition, the SMPS of the various embodiments has a lower transistor conduction loss and a reduced bulk capacitor size. Accordingly, the SMPS of the present invention is more efficient, less expensive, and has fewer heating problems than prior art systems.

Figure 1:
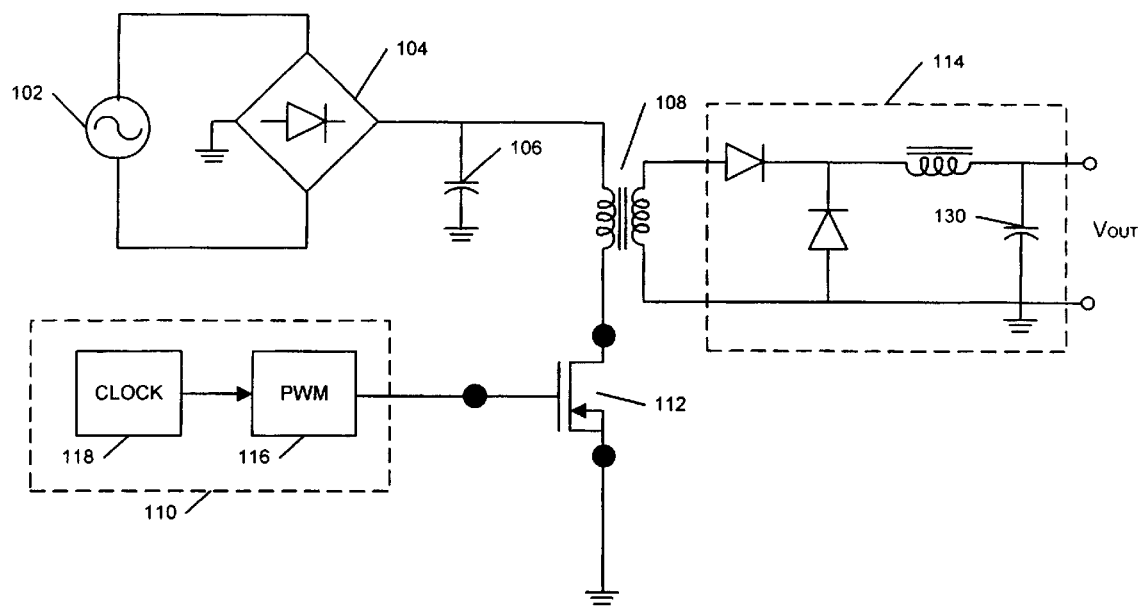
FIG. 1 illustrates a switch mode power supply (SMPS) in accordance with the prior art.
Figure 2:
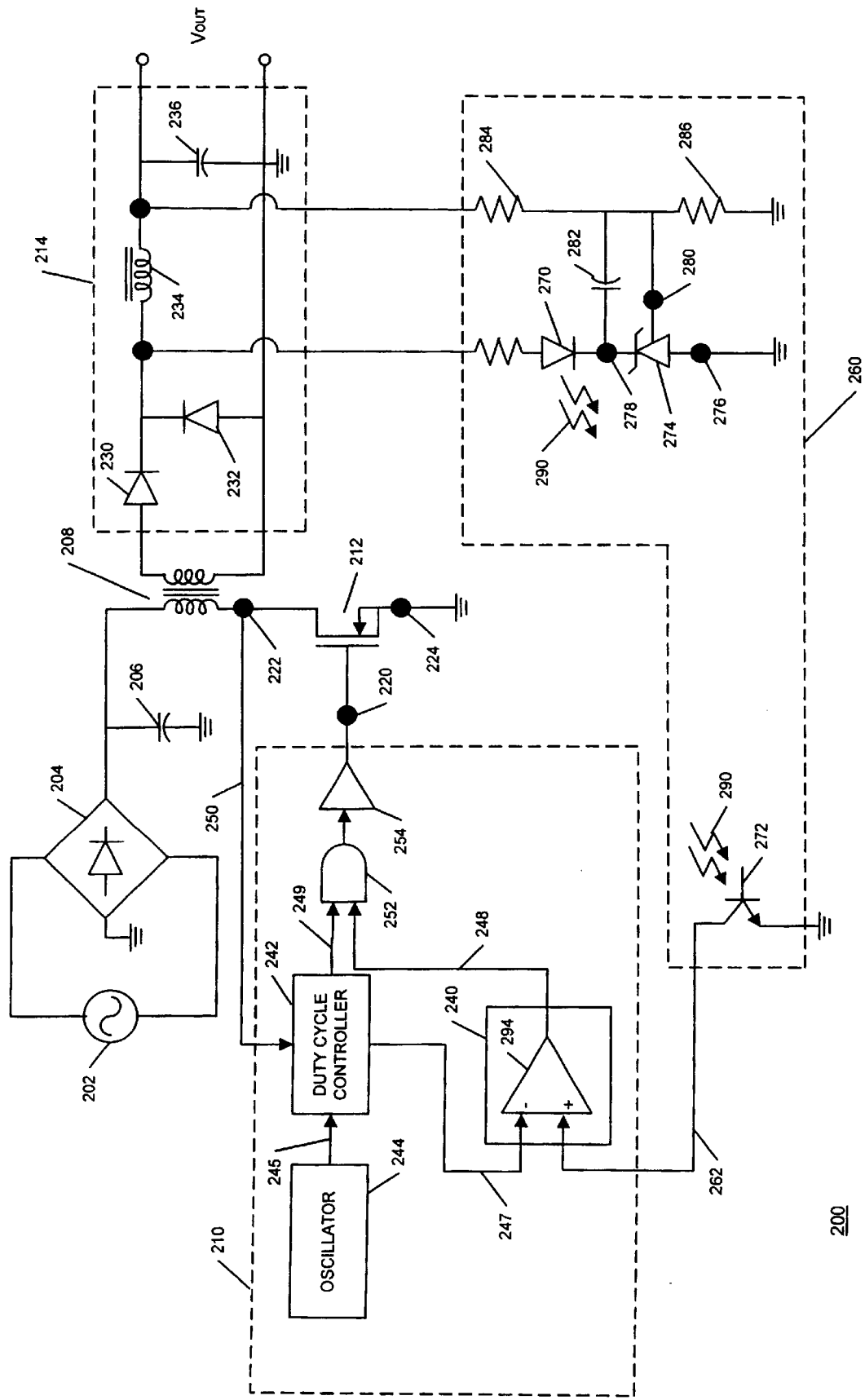
FIG. 2 illustrates an SMPS in accordance with one embodiment of the present invention.

FIG. 2 illustrates a forward mode SMPS 200 in accordance with one embodiment of the present invention. SMPS 200 is coupled to an AC input voltage source 202, and includes a full-wave rectifier 204, bulk capacitor 206, output transformer 208, power supply controller 210, a switch (e.g., a MOSFET) or a bipolar transistor), and secondary circuit 214. The topology of SMPS 200 is commonly referred to as a forward regulator. In other embodiments, certain elements of the present invention could be included in a dual transistor forward regulator.

AC input voltage source 202 provides an AC voltage between 180 Vac (low line) and 264 Vac (high line), in one embodiment. In another embodiment, AC input voltage source 202 could operate between the universal voltages of 90 Vac (low line) and 264 Vac (high line). In still other embodiments, source 202 could provide an AC voltage in other, different ranges.

Rectifier 204 is coupled to source 202. In one embodiment, rectifier 204 is a conventional, full-wave bridge rectifier, which rectifies the input AC voltage, resulting in a rectified input voltage. The output of rectifier 204 is applied to bulk capacitor 206, which smoothes the rectified voltage.

The DC voltage across capacitor 206 is applied to the upper terminal of the primary winding of transformer 208. The lower terminal of the primary winding of transformer 208 is coupled to the drain 222 of transistor 212, in one embodiment.

Transistor 212 is used as a power switch that drives the primary winding of transformer 208. Transistor 212 is controlled (i.e., turned on and off) by controller 210, which applies a switching control signal to a control terminal of the transistor. In one embodiment, the control terminal is the gate 220 of transistor 212, which is driven with a switching control signal in the form of a pulse width modulated signal produced by controller 210. Pulse width modulation is a modulation technique by which the width of an output, rectangular waveshape is varied based on some error signal. Using pulse width modulation, the overall output signal period is held constant, and its duty cycle is varied.

When transistor 212 is on, the input voltage at capacitor 206 is placed directly across the primary winding of transformer 208. This causes the primary and secondary winding currents to ramp upward to some maximum current, and also causes transformer 208 to become magnetized.

When transistor 212 is on, a small portion of the primary current is a magnetizing current that drives the transformer's magnetic core (i.e., causes the core to ramp up the B-H curve). When transistor 212 turns off, there must be a way to let the magnetizing current deplete so that the transformer core can reset itself (i.e., ramp down the B-H curve). In one embodiment, the transformer's magnetizing current is allowed to deplete by connecting a reset winding (not shown) to transformer 208. In another embodiment, an L-C circuit (not shown) is connected to transformer 208 to allow the magnetizing current to deplete.

The secondary circuit 214 includes diodes 230, 232, inductor 234, and capacitor 236, in one embodiment. In other embodiments, a secondary circuit 214 having different components could be used.

Basically, secondary circuit 214 transfers energy stored within inductor 234 and produces a regulated output voltage, VOUT. While the currents ramp upward in the primary and secondary windings, the voltage polarity on the secondary winding reverse biases diode 232, current flows through diode 230, and energy is stored within inductor 234.

Transistor 212 then turns off and the secondary winding voltage polarity reverses. Diode 230 is reverse biased, the energy stored within inductor 234 is released, and the current flow to VOUT is maintained. Because of the negative slope of the current, the voltage across inductor 234 reverses polarity. Hence, the input side of inductor 234 is clamped to one diode drop below ground by diode 232. The inductor current now flows through the diode loop, thus maintaining its continuity and removing the stored energy from inductor 234. The off period ends when transistor 212 is turned on at a predetermined time.

During the time that diode 230 is not conducting and the inductor current is depleting, VOUT is held at a relatively constant voltage by the presence of filter capacitor 236. Ideally, filter capacitor 236 supplies the full load current for the entire off time, and maintains a constant VOUT.

Regulation of VOUT is accomplished by varying the on-to-off duty cycle of transistor 212. Essentially, VOUT is regulated by increasing or decreasing the duty cycle of the pulse width modulated, control signal provided by controller 210.

Regulation of VOUT is based on the principal that the energy transferred to secondary circuit 214 is proportional to the product of the voltage and turn on time during each switching cycle (i.e., the "VT product"). The turn on time is proportional to the duty cycle of the transistor control signal (i.e., the signal at gate 220).

The duty cycle of the transistor control signal is affected by the level of the AC input voltage. At high line, the AC input voltage is higher than it is at low line. Thus, in order to maintain a constant transferred energy and a constant VOUT, the turn on duty cycle at high line is made shorter than the turn on duty cycle at low line. Accordingly, at low line, the turn on duty cycle is increased to provide the same energy transfer.

During steady state, regardless of whether the AC voltage source is providing a high line or a low line input voltage, the energy transferred to secondary circuit 214 must remain the same in order to maintain a constant VOUT. During transient state, when a sudden load increase or decrease occurs, the energy transferred must be increased or decreased, respectively, in order to maintain a constant VOUT. Therefore, in one embodiment, the value of the turn on duty cycle depends on whether SMPS 200 is in steady state or transient state, and also whether the AC voltage source is providing a high line or a low line input voltage.

In one embodiment, controller 210 includes pulse width modulator (PWM) 240, duty cycle controller 242, oscillator 244, AND gate 252, and buffer 254. These elements will be discussed in detail later.

In order to determine when SMPS 200 is in transient state, the primary side of SMPS 200 receives feedback from the secondary circuit 214 that indicates the level of VOUT. This feedback is provided to PWM 240, which produces a pulse width modulated signal having a duty cycle that is based on the feedback.

During steady state, PWM 240 produces a signal having a relatively constant duty cycle. When the load changes, causing VOUT to increase or decrease, the feedback from the secondary circuit 214 causes PWM 240 to decrease or increase, respectively, the duty cycle of the pulse width modulated signal.

In one embodiment, SMPS 200 includes an optocoupler circuit 260, which provides feedback to PWM 240 regarding the level of VOUT. Essentially, this feedback is an error signal 262, which PWM 240 compares with a divided oscillator signal 247 to produce the pulse width modulated signal 248.

Circuit 260 includes an optocoupler, which has a light emitting diode (LED) 270 and opto-transistor 272, in one embodiment. LED 270 is primarily controlled by voltage reference integrated circuit (IC) 274, in one embodiment. For example, voltage reference IC 274 could be a TL431, manufactured by ON Semiconductor or another manufacturer, although other voltage reference ICs could be used, as well. In another embodiment, voltage reference IC 274 can be replaced by a zener diode. Voltage reference IC 274 includes three pins: a first pin 276 that connects to ground; a second pin 278 that connects to LED 270 and capacitor 282; and a third pin 280 that connects to a potential divider comprised of resistors 284 and 286.

Pin 280 is referred to as a "reference pin," as it is maintained at a certain reference voltage. For example, pin 280 could be maintained at a reference voltage of 2.5 volts, although it also could be maintained at higher or lower voltages.

The second pin 278, referred to as the cathode pin, adjusts its voltage so as to maintain reference pin 280 at the reference voltage. The values of resistors 284 and 286 (i.e., the potential divider) are selected to result in a constant output voltage, VOUT.

Because the voltage at cathode pin 278 changes to maintain the reference voltage, the current running through LED 270 also changes. This current converts to a light source 290, which is transferred to opto-transistor 272 on the primary side of the SMPS.

The intensity of light source 290 serves to change the voltage at the collector of opto-transistor 272. This collector voltage is provided as an error signal to the PWM 240, which includes comparator 294. Comparator 294 compares the collector voltage 262 with the sawtooth waveform 247 from duty cycle controller 242. The output of comparator 294 is the pulse width modulated waveform 248, which has a duty cycle that depends on the collector voltage 262, and thus on the feedback provided by circuit 260.

In another embodiment, feedback is not provided using an optocoupler circuit. Instead, feedback is provided to PWM 240 via an additional winding (not shown) on the primary side of transformer 208, where the winding reflects the level of VOUT. PWM 240 adjusts the duty cycle of its output square wave, accordingly. In still other embodiments, feedback can be provided to PWM 240 using other techniques known to those of skill in the art.

During transient state operation, when the load is suddenly increased, PWM 240 may begin to produce a pulse width modulated signal having a duty cycle that could cause transformer 208 to saturate. In one embodiment, maximum duty cycle controller 242 senses the transformer flux during transient state, and limits the duty cycle of the pulse width modulated signal when transformer 208 is near saturation.

In general, it is only during transient state that a chance of exceeding the maximum turn on duty cycle may be encountered. The high line is most vulnerable, in transient state, because the magnetizing VT product at high line is much higher than it is at low line. In one embodiment, therefore, the maximum turn on duty cycle is calculated at the high line voltage, because transformer 208 has less opportunity to reset itself at high line than it does at low line.

As mentioned above, duty cycle controller 242 senses the transformer flux to determine whether transformer 208 is near saturation. The drain-source voltage, Vds, of transistor 212 is chosen to reflect the transformer flux, in one embodiment.

Figure 3:
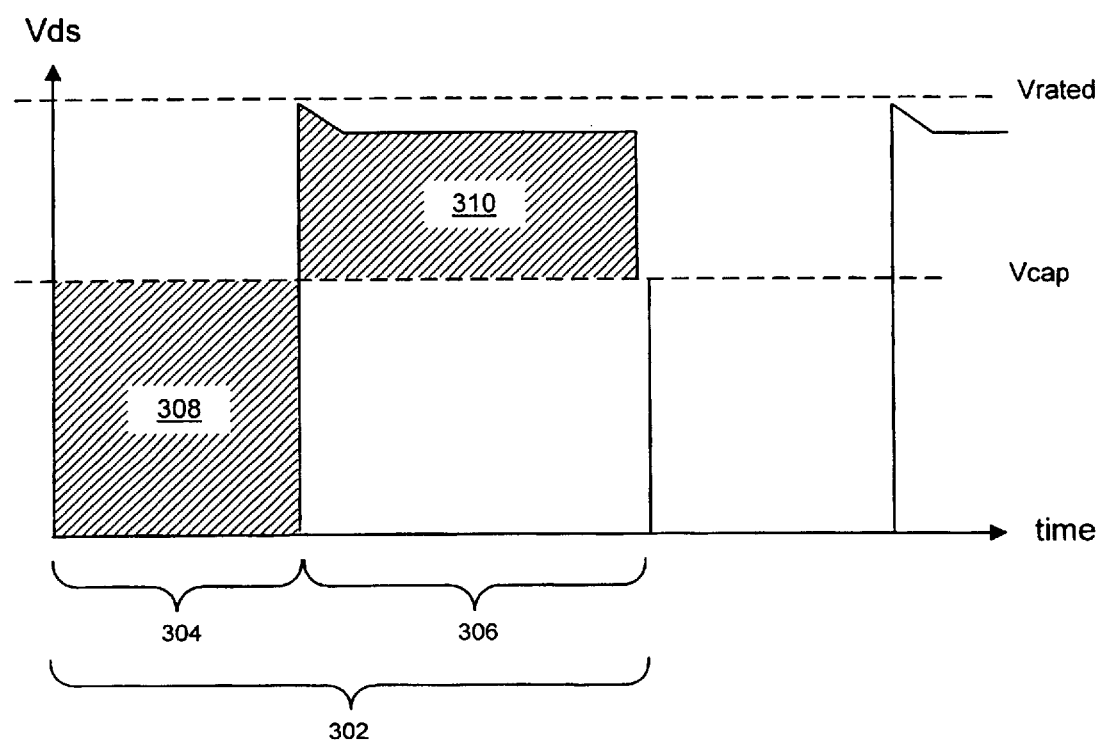
FIG. 3 is a graph illustrating a first example of an SMPS power transistor's drain-source voltage, Vds, with respect to time in accordance with one embodiment of the present invention.

FIG. 3 is a graph illustrating a first example of Vds with respect to time. The duration of one switching cycle 302 of the transistor's operation includes a magnetizing portion 304 when the power transistor is on, and a resetting portion 306 when the power transistor is off. Accordingly, the transistor controls whether the transformer is magnetizing or resetting based on whether the transistor is on or off, respectively.

During the magnetizing portion 304, a relatively low Vds occurs, while the transistor is on and the transformer becomes magnetized. During the resetting portion 306, a Vds occurs that is above the voltage on bulk capacitor 206 (FIG. 2), Vcap, but below the transistor's rated voltage, Vrated. During this time, the transistor is inactive, and the transformer attempts to reset itself.

To avoid saturating the transformer and damaging the power transistor, the steady state magnetizing voltage-time (VT) product must equal the resetting VT product. In other words, area 308 must equal area 310.

This is accomplished by controlling the transistor's maximum duty cycle at high line, Dmax. During transient state operation, an allowable Dmax (i.e., a Dmax that will not cause the transformer to saturate at high line) approximately equals (Vrated—Vcap)/Vrated, minus some tolerance due to wafer processing and dynamic range. If Dmax exceeds this value, area 310 could be larger than area 308. If this occurs for an extended period, the power transformer will become saturated, and the power transistor may be damaged by high currents. Therefore, it is desirable to maintain the transformer operation within the transformer's non—saturated region.

Referring back to FIG. 2, maintaining transformer operation within the non-saturated region is accomplished, in part, by controller 210 sensing whether transformer 208 is near saturation. In one embodiment, this is done by sensing Vds. Controller 210 then varies the maximum duty cycle of the control signal used to turn power transistor 212 on and off, if necessary. This process is described in detail, below.

Basically, PWM 240 produces a pulse width modulated signal 248 having a duty cycle that varies based on the load. During transient state, maximum duty cycle controller 242 senses Vds, via feedback lead 250, and determines whether or not transformer 208 is reset. In another embodiment, Vds can be sensed through a feedback lead to an additional winding (not shown) to transformer 208. This additional winding indicates Vds by duplicating Vds at a 1:1 ratio, or at a higher or lower ratio.

In one embodiment, controller 210 senses whether or not transformer 208 is reset for each switching cycle. In other embodiments, controller 210 could sense whether or not transformer 208 is reset more or less frequently.

Maximum duty cycle controller 242 produces a control signal 249, which serves to limit the duty cycle of the pulse-width modulated signal 248 from PWM 240. Normally, during steady state operations, the signal 249 from maximum duty cycle controller 242 does not affect the duty cycle, which is governed by PWM 240.

During transient state operations, however, maximum duty cycle controller 242 senses Vds, and shortens the duty cycle of its control signal 249, when appropriate. Control signal 249 indicates the maximum, allowable turn on duty at any particular moment, at least during transient state. By applying control signal 249 and PWM signal 248 to AND gate 252, the PWM signal 248 is allowed to pass through to control terminal 220 if the duty of signal 248 is less than the maximum, allowable turn on duty at that moment. Otherwise, maximum duty cycle controller 242 turns off transistor 212 once the maximum, allowable duty cycle is reached. Buffer 254 is used to provide enough driving current to drive transistor 212.

Said another way, during transient state operations, after transistor 212 is turned on, it is turned off either by PWM 240 or maximum duty cycle controller 242, whichever has the shorter duty. During steady state, the transistor control signal is provided by PWM 240, and it is not affected by maximum duty cycle controller 242.

In one embodiment, when maximum duty cycle controller 242 senses that Vds is above a first threshold voltage, indicating incomplete reset, it sets the duty cycle of control signal 249 to a first length (e.g., 40%). When Vds is below the first threshold voltage, but above a second threshold voltage, it sets the duty cycle of control signal 249 to a second length (e.g., 60%). When Vds is below both thresh-old voltages, indicating complete reset, it sets the duty cycle of control signal 249 to a third length (e.g., 80%).

Figure 4:
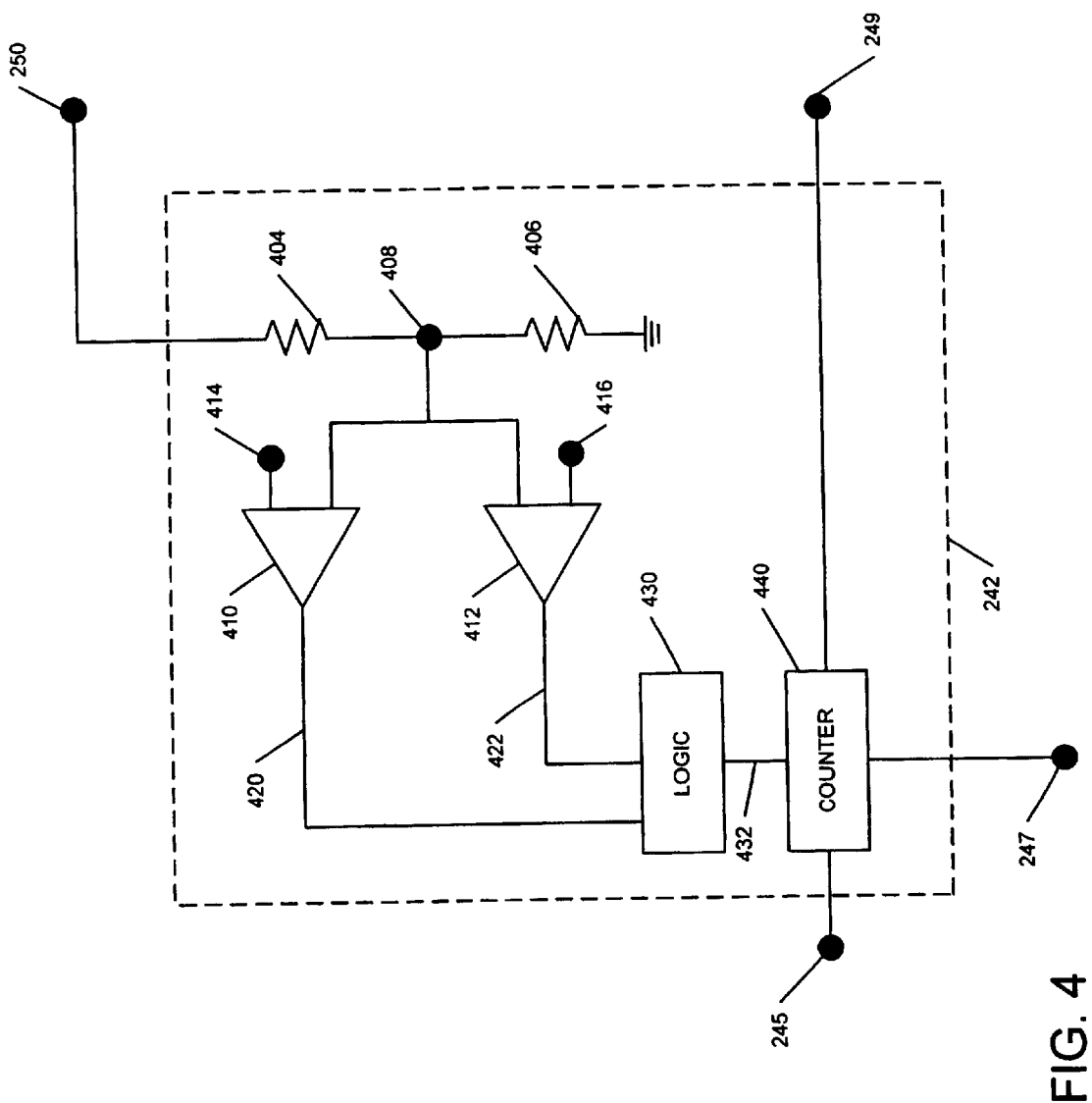
FIG. 4 illustrates a maximum duty cycle controller in accordance with one embodiment of the present invention.

FIG. 4 illustrates a maximum duty cycle controller 242 in accordance with one embodiment of the present invention. Controller 242 includes resistors 404, 406, comparators 410, 412, logic block 430, and counter 440, in one embodiment. Resistors 404, 406 receive Vds via feedback lead 250 (FIG. 2), which is coupled to the bottom of the primary winding, in one embodiment. Resistors 404, 406 form a potential divider, which yields a divided-down voltage at node 408. The divided-down voltage 408 represents a fraction of Vds. In one embodiment, the potential divider formed from resistors 404, 406 reduces Vds to a very low level (e.g., in a range of several volts). Accordingly, resistor 404 has a higher value than resistor 406.

The voltage present at node 408 is input into comparators 410, 412. Comparator 410 compares the voltage at node 408 to a first reference voltage 414, to detect whether Vds has reached a first voltage threshold. Similarly, comparator 412 compares the voltage at node 408 to a second reference voltage 416 to detect whether Vds has reached a second voltage threshold.

In alternate embodiments, more or fewer comparators could be used to detect whether Vds has reached more or fewer voltage thresholds. In addition, the comparators could be used to detect whether Vds has reached thresholds that are different from the high line and/or low line voltages.

The outputs 420, 422 of comparators 410, 412 have logical "1" or logical "0" values, in one embodiment. Thus, if the comparator 410, 412 detects Vds to be above the particular threshold voltage, a logical "1" is output. If not, a logical "0" is output. In this embodiment, three states are possible: 1) comparators 410, 412 output "00" (e.g., Vds is lower than the second threshold voltage); 2) comparators 410, 412 output "01" (e.g., Vds is between the first threshold and second threshold voltages); and 3) comparators 410, 412 output "11" (e.g., Vds is higher than the first threshold voltage).

The outputs 420, 422 of comparators 410, 412 are inter-preted by logic block 430. Based on which of the three logical states is detected at logic block 430, block 430 determines what the maximum turn on duty cycle should be (e.g., 40, 60, or 80%).

If Vds is above the first threshold voltage (e.g., 380V), that indicates that the magnetic flux in transformer 208 (FIG. 2) is not totally reset, and logic block 430 indicates that the duty cycle, Dmax, should be limited to a first limit (e.g., 40%) during the next switching cycle. If Vds is between the first threshold and second threshold voltages, that indicates that the magnetic flux in transformer 208 is totally reset, and logic block 430 indicates that Dmax should be limited to a second limit (e.g., 60%) that is greater than the first limit, during the next cycle. Finally, if Vds is below the second threshold voltage (e.g., below 215 volts), it indicates that the AC power is switched off to the power supply, and the maximum turn on duty is allowed to increase to a third limit (e.g., 80%) that is greater than the second limit.

In an example embodiment, a voltage of 215V is used as the lower detection voltage. As would be obvious to one of skill in the art based on the description herein, other detection voltages could also be used. In one embodiment, a relationship exists between the lower detection voltage, the voltage at bulk capacitor 206, and the turn on duty necessary to maintain VOUT at regulation. The table, below, illustrates this relationship, showing that the turn on duty is inversely proportional to the voltage, Vbulk, at bulk capacitor 206. The values in the table are for explanation purposes only, and these values could be different in various embodiments.

| Vbulk | VOUT | Turn On Duty |
|---|---|---|
| 254.5 | 127.25 | 50.00% |
| 250 | 127.25 | 50.90% |
| 240 | 127.25 | 53.02% |
| 220 | 127.25 | 57.84% |
| 200 | 127.25 | 63.63% |
| 180 | 127.25 | 70.69% |
| 160 | 127.25 | 79.53% |

Logic block 430 provides a control signal 432 to counter 440. Counter 440 also receives an oscillator signal 245 (FIG. 2). Based on the control signal 432 and using the oscillator signal 245, counter 440 produces an output signal 249 (FIG. 2) that sets the appropriate maximum duty cycle.

In addition, counter 440 supplies, to PWM 240 (FIG. 2), a lower frequency version 247 of the oscillator signal 245, in one embodiment. In an alternate embodiment, a separate divider (not shown) could be used to provide the lower frequency signal 247.

Figure 5:
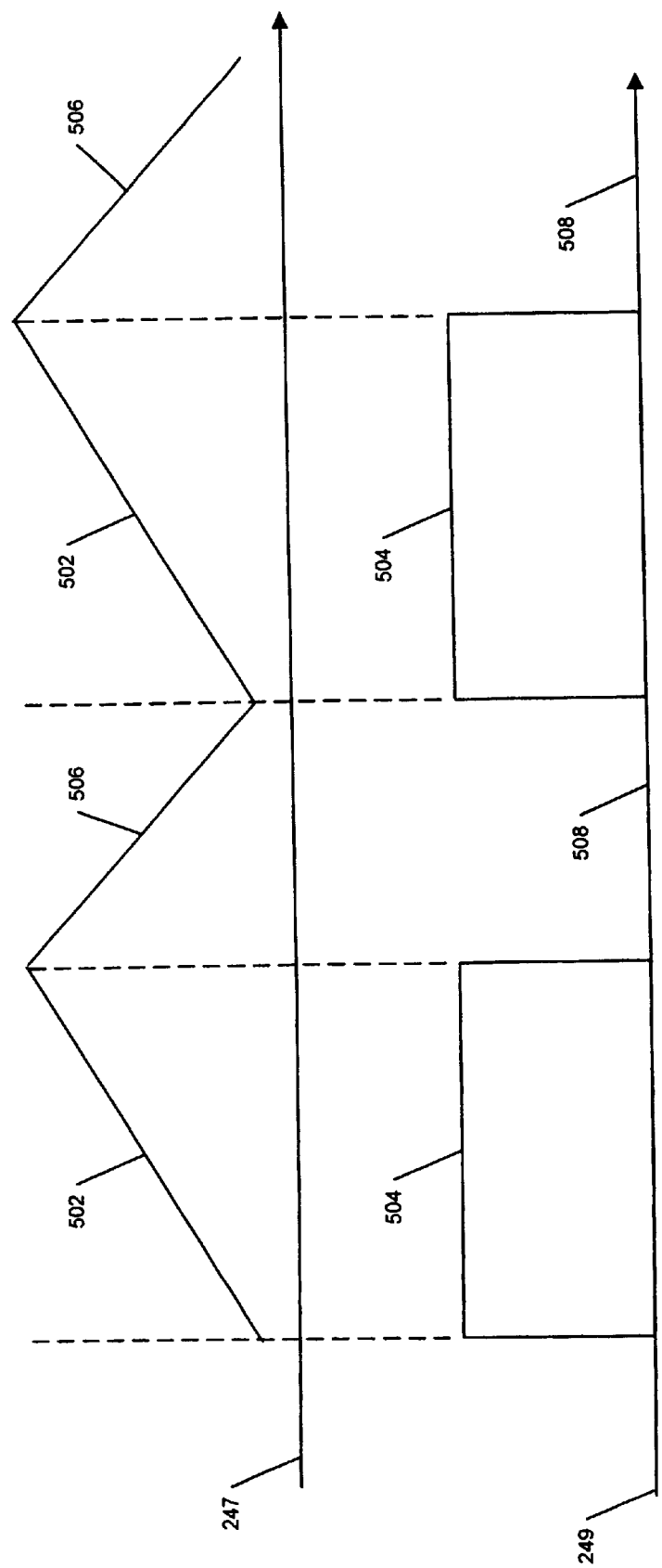
FIG. 5 illustrates the relationship between the lower frequency signal and the output signal produced by the duty cycle controller in accordance with one embodiment of the present invention.

FIG. 5 illustrates the relationship between the lower frequency signal 247 and the output signal 249 produced by duty cycle controller 242 in accordance with one embodiment of the present invention. Lower frequency signal 247 is a sawtooth waveform and output signal 249 is a square wave, in one embodiment. The figure shows that, during those portions 502 of the lower frequency signal 247 that are rising, output signal 249 is at a high state 504. During those portions 506 of the lower frequency signal 247 that are falling, output signal 249 is at a low state 508.

Referring back to FIG. 2, in one embodiment, oscillator 244 is overdriven, producing a waveform 245 having a frequency that is some multiple of the switching frequency of the pulse width modulated signal 249. Accordingly, maximum duty cycle controller 242 receives an overdriven signal 245 from oscillator 244, and PWM 240 receives a lower frequency signal 247 from duty cycle controller 242. The frequency of signal 247 (i.e., the switching frequency) is typically in a range of tens of kilohertz, although the frequency could be higher or lower than this range. In one embodiment, for example, the frequency of the oscillator waveform 245 is five times the switching frequency, although higher or lower multiples could be used in other embodiments.

Referring also to FIG. 4, counter 440 counts the number of waveform 245 peaks, and outputs a high or low signal 249 based on the control input 432 from logic block 430. Thus, for example, if the oscillator is overdriven at five times the switching frequency, and the control input 432 indicates that 80% duty is desired, then counter 440 outputs a logical "1" for four periods, then outputs a logical "0" for the fifth period. Similarly, if the control input 432 indicates that 60% duty is desired, then counter 440 outputs a logical "1" for the first three periods, then outputs a logical "0" for the fourth and fifth periods. After the fifth period, counter 440 resets to a logical "1," and begins counting again.

Referring back to FIG. 2, this output 249 is an input to AND gate 252. Whenever output 249 is a logical "1," AND gate 252 allows the pulse width modulated signal 248 to pass to buffer 254. Whenever output 249 is a logical "0," AND gate 252 blocks the pulse width modulated signal 248 from passing, and outputs a "0" to buffer 254.

In the example described above, oscillator 244 produces a waveform 245 having a frequency that is five times the switching frequency. Accordingly, counter 440 (FIG. 4) could output signal 249 having any one of five possible duty cycles. In other embodiments, as would be obvious to one of skill in the art based on the description herein, oscillator 244 could be overdriven at a higher or lower rate (e.g., 2, 3, or 10 times the switching frequency). Accordingly, in alternate embodiments, counter 440 could output a signal that could result in more or fewer different duty cycles.

Figure 6:
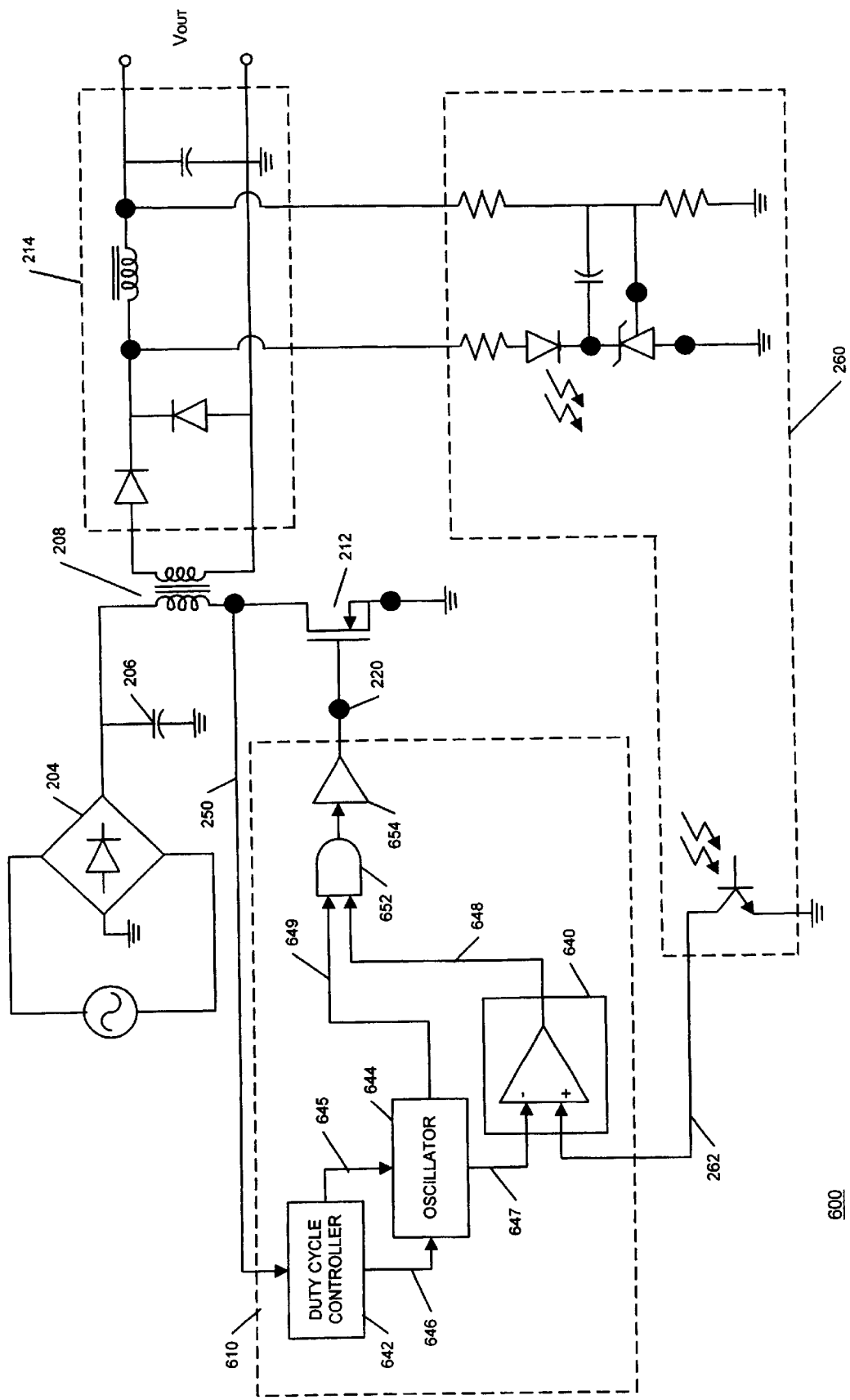
FIG. 6 illustrates an SMPS in accordance with another embodiment of the present invention.

FIG. 6 illustrates an SMPS 600 in accordance with another embodiment of the present invention. Similar to the SMPS 200 illustrated in FIG. 2, SMPS 600 includes a full-wave rectifier 204, bulk capacitor 206, output transformer 208, power supply controller 610, a switch (e.g., a MOSFET), and secondary circuit 214. In addition, in one embodiment, SMPS 600 includes an optocoupler circuit 260, which provides feedback to PWM 640 regarding the level of VOUT. Essentially, this feedback is an error signal 262, which PWM 640 compares with an internal oscillator signal 647 to produce a pulse width modulated signal 648.

The main difference between the SMPS 200, 600 illustrated in FIGS. 2 and 6 is the way that power supply controller 610 operates. In one embodiment, controller 610 includes PWM 640, duty cycle controller 642, oscillator 644, AND gate 652, and buffer 654. During transient state operations, maximum duty cycle controller 642 senses Vds, and provides control signal 645 to oscillator 644. This control signal 645 causes the duty cycle of the oscillator's output signal 649 to vary. In one embodiment, output signal 649 is a square wave.

In one embodiment, as will be described in more detail in conjunction with FIGS. 7 and 8, the duty cycle of output signal 649 also varies based on the slope of an oscillator waveform 647, generated internally by oscillator 644. This oscillator slope is controlled by another control signal 646, which is provided by duty cycle controller 642 to oscillator 644.

In another embodiment, as will be described in more detail in conjunction with FIGS. 9 and 10, the duty cycle of output signal 649 is independent of the slope of the internal oscillator waveform 647. Accordingly, duty cycle controller 642 does not necessarily provide a control signal 646 to oscillator 644.

Output signal 649 indicates the maximum, allowable turn on duty at any particular moment, at least during transient state. By applying control signal 649 and PWM signal 648 to AND gate 652, the PWM signal 648 is allowed to pass through to control terminal 220 if the duty of signal 648 is less than the maximum, allowable turn on duty at that moment. Otherwise, maximum duty cycle controller 642 causes the output signal 649 to turn off transistor 212 once the maximum, allowable duty cycle is reached. Buffer 654 is used to provide enough driving current to drive transistor 212.

Figure 7:
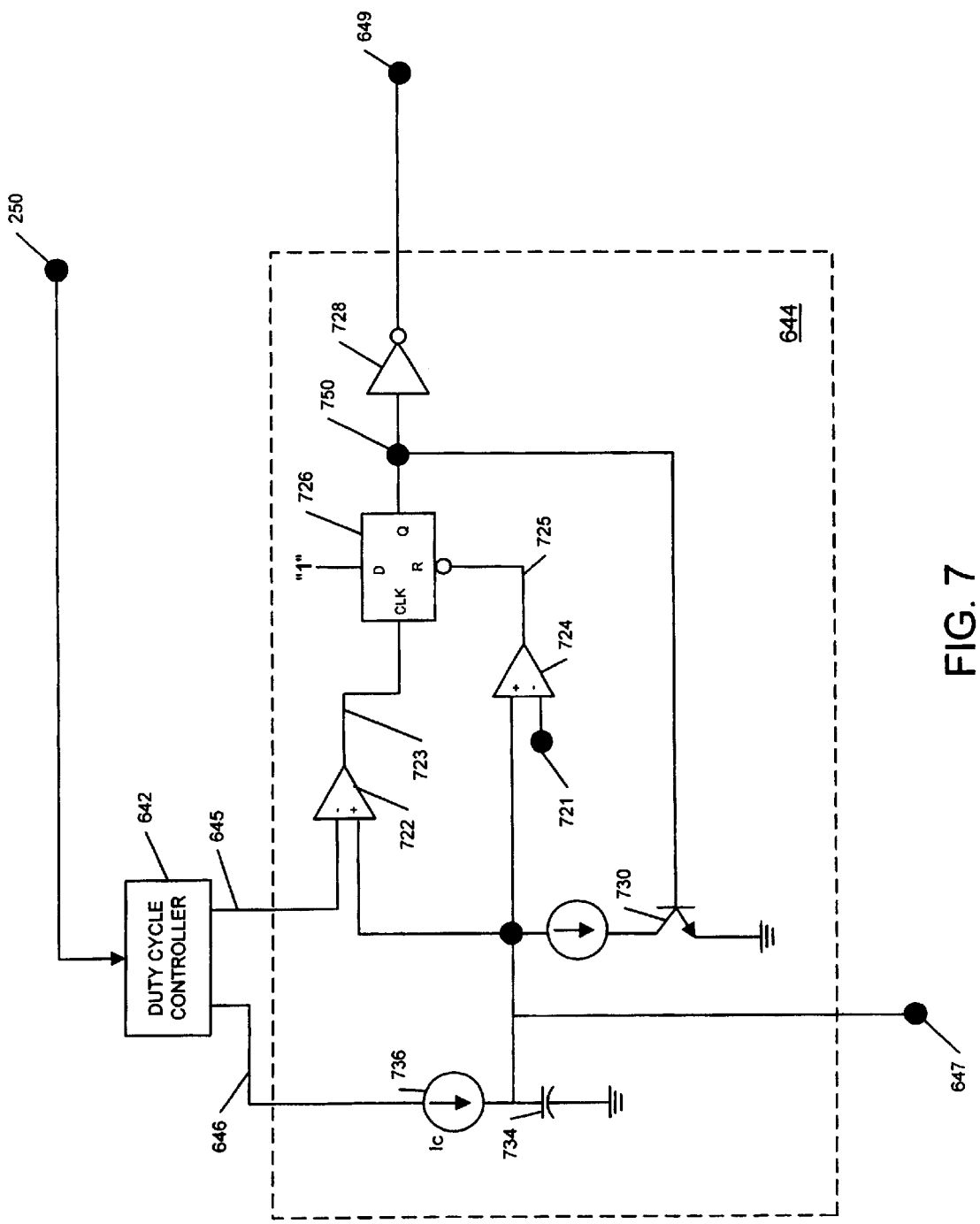
FIG. 7 illustrates a duty cycle controller and oscillator in accordance with one embodiment of the present invention.

FIG. 7 illustrates a duty cycle controller 642 and oscillator 644, in accordance with one embodiment of the present invention. Oscillator 644 includes a capacitor 734 and current source 736. Current source 736 charges capacitor 734, and once transistor 730 is activated, capacitor 734 begins to discharge. When charged, the voltage of capacitor 734 is increased until it reaches a high-voltage level, Vhigh, and when discharged the voltage is decreased to a low voltage level, Vlow. This results in an internal, sawtooth oscillator waveform, which alternates between charging and discharging phases, and between Vhigh and Vlow. In one embodiment, the alternating waveform is a sawtooth waveform, although the waveform could have different shapes in other embodiments.

Duty cycle controller 642 senses Vds via lead 250. Based on Vds, duty cycle controller 642 sends a control signal 646 to oscillator 644, which causes current source 736 to charge capacitor 734 faster or slower (i.e., causes the charging portion slope to be steeper or more shallow). In addition, duty cycle controller 642 sends another control signal 645 to oscillator 644, which indicates a peak voltage, Vhigh, that capacitor 734 should obtain before the discharging phase is initiated. The operation of duty cycle controller 642 and the relationship of the charging current, Vhigh, and the duty cycle of the transistor control signal at terminal 220 (FIG. 6) will be described in more detail in conjunction with FIG. 8.

Oscillator 644 also includes comparators 722, 724, latch 726, inverter 728, and transistor 730, in one embodiment. An internal oscillator waveform 647 is received by comparators 722, 724. The first comparator 722 compares the oscillator waveform with a voltage, Vhigh, indicated by control signal 645. The output signal 723 from comparator 722 is essentially a square wave that is a logical "1" when the voltage on capacitor 734 is at or above Vhigh.

The second comparator 724 compares the oscillator waveform with a second reference voltage 721, Vlow, which represents a minimum voltage that capacitor 734 will obtain before the charging phase begins. The output signal 725 from comparator 724 is essentially a square wave that is a logical "1" when the capacitor voltage is at or above Vlow.

The output signal 723 from comparator 722 supplies a clock signal to latch 726. This clock signal 723 causes latch 726 to clock out a logical "1", which is present at one input of latch 726. The resulting signal 750 is provided as feedback to transistor 730, which controls the timing of the charging and discharging phases of capacitor 734. Signal 750 is also inverted by inverter 728, resulting in control signal 649. Referring also to FIG. 6, control signal 649 is then used to limit the duty cycle of the PWM signal 648.

Signal 750 from latch 726 alternates based on whether the capacitor 734 is charging or discharging. During the capacitor's charging phase, signal 750 is a logical "0," causing transistor 730 to be in an inactive state. When the capacitor's voltage reaches Vhigh, signal 750 becomes a logical "1," which activates transistor 730, and enables capacitor 734 to discharge.

As the above description indicates, the slope of the capacitor's 734 charging phase and the duration of the charging and discharging phases are dependent on the charging current, Ic, and the value of Vhigh. In addition, the duty cycle of the control signal 645 (FIG. 6) is dependent on the duration of the charging and discharging phases. Accordingly, in one embodiment, the duty cycle of the output signal 649 is varied by duty cycle controller 642, which adjusts the charging current, Ic, and the reference voltage, Vhigh. This is explained in more detail below, with reference to FIG. 8.

Figure 8:
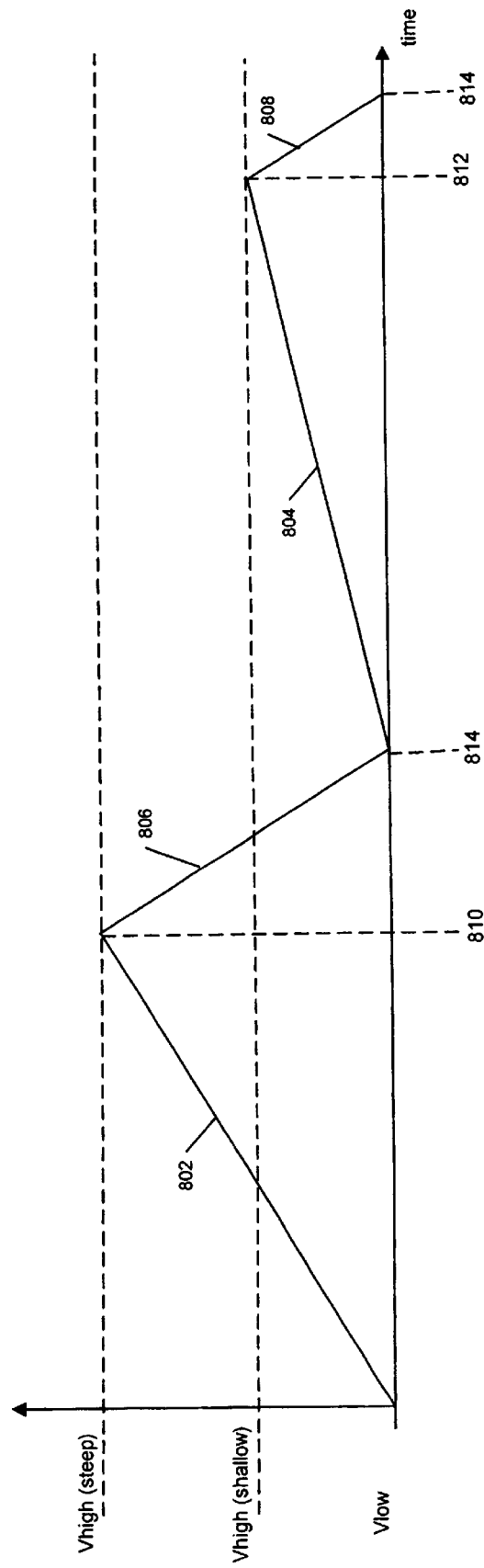
FIG. 8 illustrates an example of two periods of an internal oscillator waveform in accordance with one embodiment of the present invention.

FIG. 8 illustrates an example of two periods of an internal oscillator waveform 647 (FIGS. 6, 7) in accordance with one embodiment of the present invention. The first waveform includes a charging portion 802 and a discharging portion 806, and the second waveform includes a charging portion 804 and a discharging portion 808.

The slope of the charging portion 802, 804 depends on the current, Ic, provided to charge the oscillator's capacitor (e.g., capacitor 734, FIG. 7). A first level of current from current source 736 results in a fairly steep charging portion 802, and a second level of current results in a less steep charging portion 804. In one embodiment, duty cycle controller 642 (FIGS. 6 and 7) provides a control signal 646, which adjusts Ic to vary the slope of the charging portion. By adjusting the slope of the charging portion, the time when capacitor 734 reaches a peak voltage, Vhigh, is also adjusted. A steeper slope causes Vhigh to occur earlier in the switching cycle, and a shallower slope causes Vhigh to occur later.

The slope of the discharging portion is not easily adjustable. Nonetheless, it is desirable to time the discharging portions 806, 808 so that they complete at times 814 that coincide with the end of each switching cycle. Therefore, as the slope of the charging portion increases, then the peak voltage, Vhigh, should also be increased in order for the discharging portion to complete at the ends 814 of the switching cycles. In one embodiment, duty cycle controller 642 (FIGS. 6 and 7) adjusts Vhigh so that the discharging portion completes at the end of the switching cycle.

FIG. 8 illustrates that a higher Ic and a higher Vhigh results in a charging portion 802 that completes earlier than the charging portion 804 that results from a lower Ic and a lower Vhigh. Referring back to FIG. 7, this means that a steeper slope and higher Vhigh results in an output signal 649 (FIGS. 6 and 7) with a shorter duty cycle. A shallower slope and a lower Vhigh result in an output signal 649 with a longer duty cycle. For example, a charging portion 802 that ends at time 810 could correspond to a 60% duty cycle, and a charging portion 804 that ends at time 812 could correspond to an 80% duty cycle. Accordingly, by adjusting Ic and Vhigh, the duty cycle of the output signal 649 is also adjusted, in one embodiment. By adjusting Ic and Vhigh, duty cycle controller-642 can adjust the output of comparator 722 (FIG. 7), latch 726 (FIG. 7), inverter 728 (FIG. 7), and AND gate 652 (FIG. 6), thus adjusting the duty cycle of the transistor control signal at terminal 220 (FIG. 6).

Referring back to FIGS. 6 and 7, duty cycle controller 642 determines a charging current, Ic, which will result in a desired maximum duty cycle for the transistor control signal at terminal 220. This desired maximum duty cycle depends on the flux of transformer 208. In one embodiment, duty cycle controller 642 makes its duty cycle determination in a manner similar to that described in conjunction with FIG. 4, except that counter 440 (FIG. 4) is not essential, and logic block 430 (FIG. 4) creates a control signal 646 that will cause the oscillator's current source 736 to produce the charging current, Ic, which will result in the desired duty cycle. In addition, duty cycle controller 642 sets the reference voltage input 645 to comparator 722 to the appropriate Vhigh value, as explained above.

Basically, controller 642 adjusts the oscillator slope (i.e., the slope of the charging portion of the internal oscillator waveform at the top of capacitor 734, FIG. 7) to alter the ratio of the charging portion time and the discharging portion time, although the period of the internal oscillator waveform remains essentially the same. This adjustable-slope waveform is used to control the maximum duty cycle of the transistor control signal at terminal 220.

In the embodiment described in conjunction with FIGS. 6–8, duty cycle controller 642 caused the duty cycle of the transistor control signal at terminal 220 to vary by altering Vhigh and the slope of the internal oscillator waveform. In another embodiment, described in conjunction with FIGS. 6, 9, and 10, duty cycle controller 642 causes the duty cycle of the transistor control signal at terminal 220 to vary by altering a reference voltage, Vcontrol, only.

Figure 9:
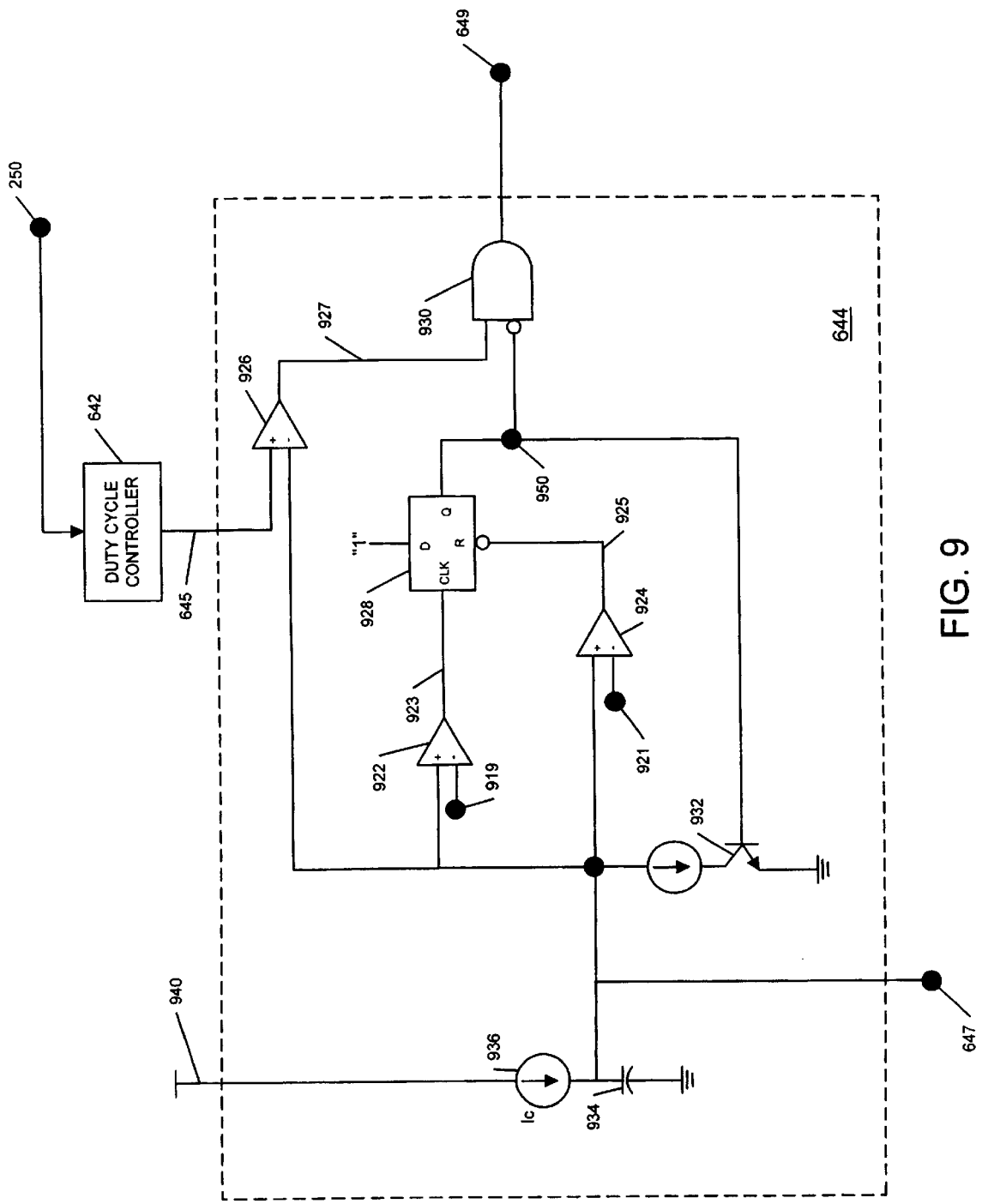
FIG. 9 illustrates a duty cycle controller and oscillator in accordance with another embodiment of the present invention.

FIG. 9 illustrates a duty cycle controller 642 and oscillator 644, in accordance with another embodiment of the present invention. As with the oscillator described in conjunction with FIG. 7, oscillator 644 includes a capacitor 934 and current source 936. When fully charged, capacitor 934 is at a high-voltage level, Vhigh, and when discharged it is at a low voltage level, Vlow. This results in an internal, sawtooth oscillator waveform, which alternates between charging and discharging phases, and between Vhigh and Vlow. Unlike the embodiment described in conjunction with FIG. 7, the charging current provided by current source 936 is relatively constant, and is not affected by duty cycle controller 642. Accordingly, capacitor 934 produces a sawtooth waveform having a relatively constant slope, in one embodiment, although the waveform could have different shapes in other embodiments.

Oscillator 644 also includes comparators 922, 924, 926, latch 928, gate 930, and transistor 932. The internal oscillator waveform 647 is received by comparators 922, 924, and 926. The first comparator 922 compares the oscillator waveform with a voltage, Vhigh, which represents the high voltage that capacitor 934 will attain at the end of its charging phase. The output signal 923 from comparator 922 is essentially a square wave that is a logical "1" when the voltage on capacitor 934 is at or above Vhigh.

The second comparator 924 compares the oscillator waveform with a second reference voltage 921, Vlow, which represents a minimum voltage that capacitor 934 will obtain before the charging phase begins. The output signal 925 from comparator 924 is essentially a square wave that is a logical "1" when the capacitor voltage is at or above Vlow.

The output signal 923 from comparator 922 supplies a clock signal to latch 928. This clock signal 923 causes latch 928 to clock out a logical "1", which is present at one input of latch 928. The resulting signal 950 is provided as feedback to transistor 932, which controls the timing of the charging and discharging phases of capacitor 934.

Signal 950 from latch 926 alternates based on whether the capacitor 934 is charging or discharging. During the capacitor's charging phase, signal 950 is a logical "0," causing transistor 930 to be in an inactive state. When the capacitor's voltage reaches Vhigh, signal 950 becomes a logical "1," which activates transistor 930, and enables capacitor 934 to discharge.

Duty cycle controller 642 senses Vds via lead 250. Based on Vds, duty cycle controller 642 sends a control signal 645 to oscillator 644. Control signal 645 indicates the value of a reference voltage, referred to herein as Vcontrol. The output signal 927 from comparator 926 is essentially a square wave that is a logical "1" when the voltage on capacitor 934 is at or above Vcontrol. The operation of duty cycle controller 642 and the relationship of the Vcontrol and the duty cycle of the transistor control signal at terminal 220 (FIG. 6) will be described in more detail in conjunction with FIG. 10.

Signal 927 from comparator 926 is provided as an input to gate 930. The other input to gate 930 is an inverted representation of the signal 950 from latch 928. Gate 930 compares signal 927 and the inverted signal 950, and produces control signal 649. Referring also to FIG. 6, control signal 649 is then used to limit the duty cycle of the PWM signal 648.

Figure 10:
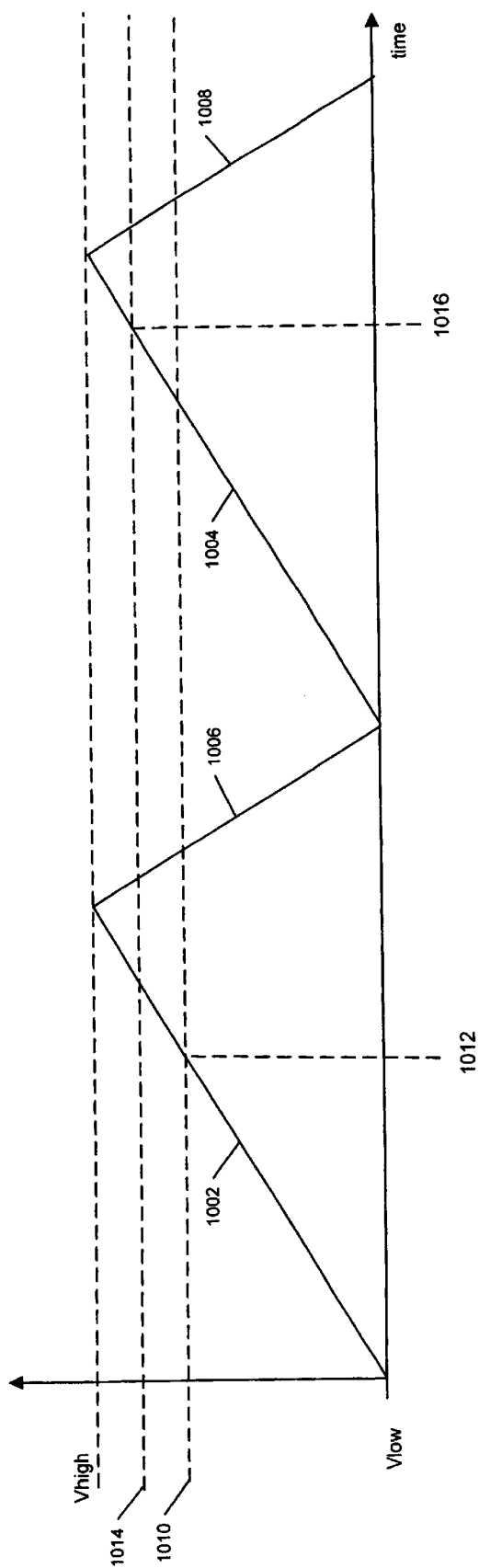
FIG. 10 illustrates an example of two periods of an internal oscillator waveform in accordance with one embodiment of the present invention.

FIG. 10 illustrates an example of two periods of an internal oscillator waveform 647 (FIGS. 6, 9) in accordance with one embodiment of the present invention. The waveform includes charging portions 1002, 1004 and discharging portions 1006, 1008. Each charging portion 1002, 1004 ends, and the discharging portions 1006, 1008 begin, when the voltage on capacitor 934 (FIG. 9) reaches Vhigh.

As explained in conjunction with FIG. 9, the duty cycle of the transistor control signal at terminal 220 (FIG. 6) is determined by a control voltage, Vcontrol, which is set by duty cycle controller 642 (FIG. 9) based on Vds. When the voltage on capacitor 934 exceeds Vcontrol, then comparator 926 outputs a logical Accordingly, as FIG. 10 illustrates, when duty cycle controller 642 sets Vcontrol to a lower level 1010, the voltage on capacitor 934 will exceed Vcontrol at a first time 1012 during the switching cycle. When duty cycle controller 642 sets Vcontrol to a higher level 1014, the voltage on capacitor 934 will exceed Vcontrol at a second, later time 1016 during the switching cycle. By adjusting the level of Vcontrol, duty cycle controller 642 can adjust the output of comparator 926 (FIG. 9), gate 930 (FIG. 9), and AND gate 652 (FIG. 6), thus adjusting the duty cycle of the transistor control signal at terminal 220 (FIG. 6).

Operation of controller 210 (FIGS. 2 and 7) during various states of transformer flux will now be explained in more detail by way of several examples. As described previously, controller 210 controls transistor 212 by providing a control signal with a maximum duty cycle, Dmax.

During transient state operations, when maximum duty cycle controller 242, 642 (FIGS. 2 and 6) determines that the magnetic flux in transformer 208 is not yet totally reset, maximum duty cycle controller 242, 642 limits Dmax to a first limit during the next cycle. In one embodiment, this first limit is 40%, although it could be higher or lower in other embodiments.

Figure 11:
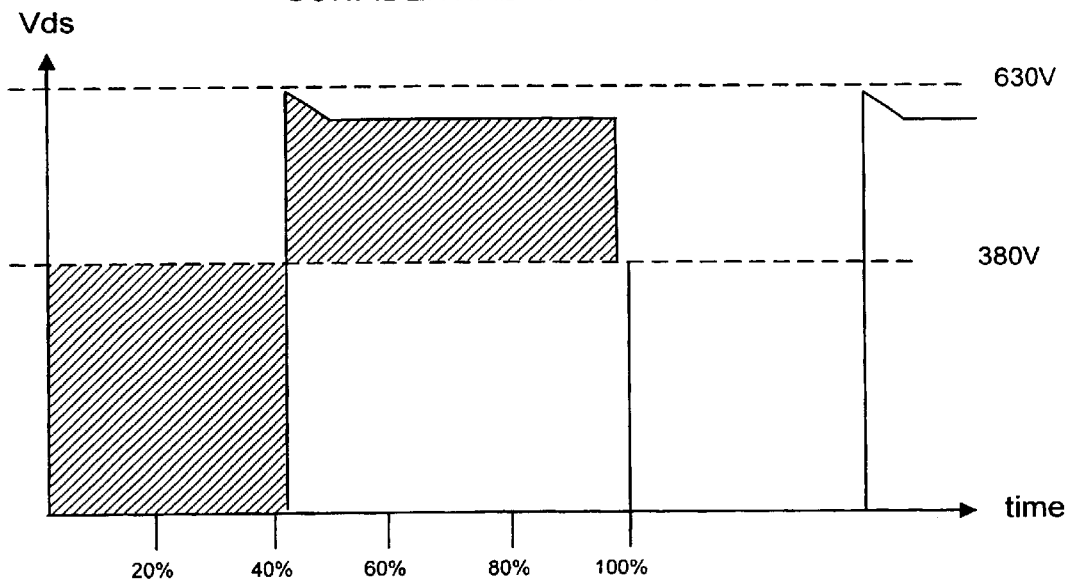
FIG. 11 is a graph illustrating a second example of Vds with respect to time in accordance with one embodiment of the present invention.

This case is illustrated in FIG. 11, which is a graph illustrating a second example of Vds with respect to time in accordance with one embodiment of the present invention. In the example shown, the transistor's rated voltage, Vrated, is 630V. In a system that uses an AC voltage source having a range of 180V (low line) to 264V (high line), the bulk capacitor voltage is 380V during high line.

It should be noted that steady state operations are somewhat different. For example, if the low line, steady state, full load turn on duty cycle is a certain percentage (e.g., 33%), then the high line, steady state, full load turn on duty would be less (e.g., 22.5%). Using the various embodiments of the present invention, the low line and high line, steady state turn on duties can be increased. For example, the low line, steady state duty could be increased to about 50%, and the high line, steady state duty could be increased to about 34%, although other values could be used in various embodiments. This is true for each of the examples described below.

In one embodiment, maximum duty cycle controller 242, 642 determines whether the magnetic flux in transformer 208 is totally reset by looking at Vds just before a switching cycle starts. If Vds is between 215V to 450V just before a switching cycle starts, indicating that the magnetic flux in transformer 208 is totally reset, maximum duty cycle controller 242, 642 limits the maximum duty cycle, Dmax, to a second limit that is greater than the first limit. In one embodiment, this second limit is 60%, although it could be higher or lower in other embodiments.

Figure 12:
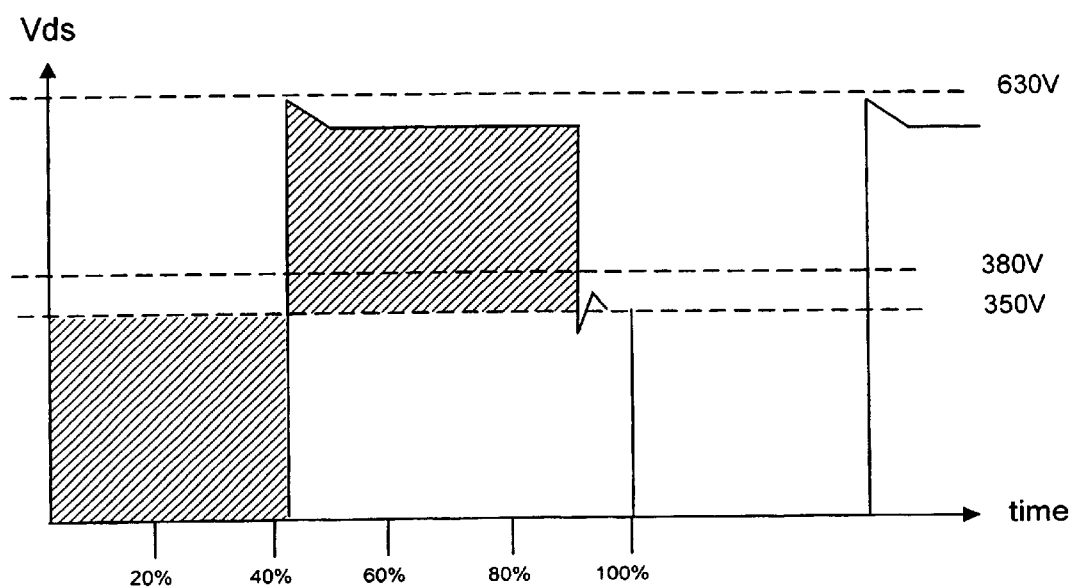
FIG. 12 is a graph illustrating a third example of Vds with respect to time in accordance with one embodiment of the present invention.

This case is illustrated in FIG. 12, which is a graph illustrating a third example of Vds with respect to time in accordance with one embodiment of the present invention. The bulk capacitor voltage approximately equals the input AC line voltage times √2. The bulk capacitor voltage, as shown in FIG. 12, is 350V. This reflects that the input AC voltage is at about 248V, which indicates that the input AC voltage is not yet at high line.

Finally, when maximum duty cycle controller 242, 642 determines that the transformer 208 is totally reset, and Vds is below the low line (e.g., Vds<215V, a condition that occurs when power to SMPS 200, 600 is off), maximum duty cycle controller 242, 642 limits the duty cycle, Dmax, to a third limit, during the next cycle, which is greater than the second limit. In one embodiment, this third limit is 80%, although it could be higher or lower in other embodiments. When Vds is less than 215V, it indicates that the bulk capacitor voltage has dropped below the low line, because the low line bulk capacitor voltage is roughly 180×√=255V.

Figure 13:
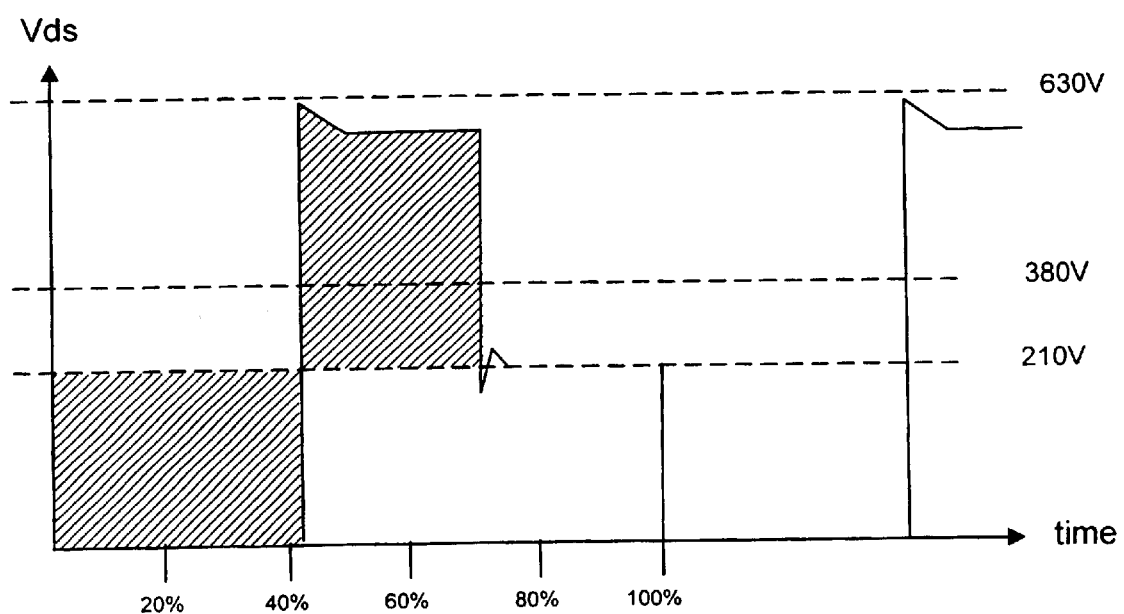
FIG. 13 is a graph illustrating a fourth example of Vds with respect to time in accordance with one embodiment of the present invention.

This case is illustrated in FIG. 13, which is a graph illustrating a fourth example of Vds with respect to time in accordance with one embodiment of the present invention. The bulk capacitor voltage, in the example shown, is 210V. The advantages provided by the SMPS of the various embodiments of the present invention are illustrated, below, by way of an example that contrasts prior art systems with the present invention. These advantages include increased efficiency, reduced heating problems, and lower system cost.

PRIOR ART EXAMPLE

As mentioned previously, prior art systems set a fixed, maximum duty cycle. In these systems, the maximum duty cycle, Dmax, is based on the rectified high line voltage, Vrect, and the power transistor rating, Vrated, using the following equation:

$$Dmax=(Vrated-Vrect)/Vrated.$$

For example, a system could use an on-line voltage from 180Vac (low line) to 264Vac (high line), where Vrect=√2× 264V≅380V. Vrated could be approximately 630V. In such a system:

$$Dmax=(630V-380V)/630V=40\%.$$

With a wafer processing tolerance (e.g., 36%–40%) and a dynamic range incorporated into the equation, a typical useable Dmax is 36% and a useable duty cycle at low line, Dll, is approximately 33%. This means that the low line, steady state turn on duty is approximately 33%. During transient state, no matter whether low line or high line conditions exist, the maximum turn on duty would be limited to approximately 36–40%.

A typical FET has an active drain-source resistance, Rdson, of approximately 6 ohms. On a 145W power supply with 70% efficiency, the transistor's average active current, Id, and power dissipation, Pdiss, can be calculated as follows:

$$Id=150W/70\%/(1.414\times180V)/33\%=2.55A,$$

$$Pdiss=2.55A^2\times6\ ohms\times33\%=13W\ at\ low\ line.$$

As described previously, the hold up time is the minimum period of time required to maintain VOUT within regulation after AC power is switched off to the SMPS. To provide a hold up time of 20 ms, the energy required is calculated as follows:

$$E=150W/70\%\times20\ ms=4.3\ joules.$$

With Vcap=250V at low line, Dll of 33%, and Dmax of 36%, the system will start to lose regulation at approximately 250V×33%/36%=230V. Thus, the required bulk capacitor size, Cbulk, can be calculated as follows:

Cbulk=(2×4.3 joules)/(250V$^2$−230V$^2$)=890 µF.

Using the example prior art system, the 13W power transistor conduction loss, Pdiss, and the 890 µF bulk capacitor size, Cbulk, are both relatively high. The high conduction loss indicates that these prior art systems are inefficient, and could have heat dissipation problems. In addition, the large bulk capacitor is expensive and requires a large amount of space.

PRESENT INVENTION EMBODIMENT EXAMPLE

In contrast to the prior art systems, the SMPS of the various embodiments of the present invention have lower conduction losses and require smaller bulk capacitors. Because various embodiments of the present invention sense transformer saturation and automatically switch between multiple duty cycle limits (e.g., 40%, 60%, and 80%), the limitation to the useable duty cycle at low line, Dll, can be increased. In one embodiment, Dll can be increased to about 50%.

Using the same parameters as above (i.e., 145W power supply, 70% efficiency, and Rdson of approximately 6 ohms), the transistor's average active current, Id, and power dissipation, Pdiss, are calculated as follows:

Id=150W/70%/(1.414×180V)/50%=1.68A,

Pdiss=1.68A$^2$×6 ohms×50%=8.5W at low line.

With Vcap=250V at low line and Dll=50%, Dmax is allowed to increase using various embodiments of the present invention. In one embodiment, if Vds drops below 215V just before the next switching cycle starts, the system recognizes that AC power is switched off. Then, Dmax can be increased to 80%. When Dmax is about 80%, the system starts to lose regulation. By that time Vcap=250V×50%/80%=156V. Thus, the required bulk capacitor size, Cbulk, can be calculated as follows:

Cbulk=(2×4.3 joules)/(250V$^2$−156V$^2$)=225 µF.

The above examples show that, using various embodiments of the present invention, the transistor conduction loss is reduced from 13W to 8.5W, and the bulk capacitor value is reduced from 890 µF to 225 µF. Accordingly, the SMPS of the various embodiments of the present invention have improved efficiency, reduced heating problems, and reduced cost over prior art devices.

In the foregoing detailed description, reference is made to the accompanying drawings, which form a part hereof, and in which are shown by way of illustration specific embodiments in which the invention may be practiced. These embodiments are described in sufficient detail to enable those skilled in the art to practice the invention. The foregoing detailed description uses terms that are provided in order to make the detailed description more easily understandable. It is to be understood that these terms and the phraseology employed in the description should not be construed to limit the scope of the invention.

It will be further understood that the block diagrams illustrated in the figures are merely representational and are not drawn to scale. Certain proportions thereof may be exaggerated, while others may be minimized. The figures are intended to illustrate various implementations of the invention, which can be understood and appropriately carried out by those of ordinary skill in the art.

It will be appreciated by those of ordinary skill in the art that any arrangement, which is calculated to achieve the same purpose, may be substituted for the specific embodiment shown. Finally, although the present invention is described in conjunction with an integrated circuit load, it could also be implemented in any other type of electronic system that has a use for an SMPS with the characteristics of the present invention.

This application is intended to cover any adaptations or variations of the present invention that fall within its scope. The foregoing detailed description, therefore, is not to be taken in a limiting sense, and it will be readily understood by those skilled in the art that various changes in the details, materials, and arrangements of the parts and operations which have been described and illustrated in order to explain the nature of this invention may be made without departing from the spirit and scope of the invention as expressed in the adjoining claims.

What is claimed is:

1. An apparatus for controlling a power supply, which includes a transformer having a primary winding and a secondary winding, and a switch that drives the primary winding and is controlled with a switching control signal, the apparatus comprising:
    a controller that senses whether or not the transformer is reset and produces the switching control signal at a switching frequency, wherein the switching control signal has a duty cycle that is limited to a first limit when the transformer is not reset, and limited to a second limit when the transformer is reset, wherein the controller includes
    a pulse width modulator that produces a pulse width modulated signal at the switching frequency;
    a duty cycle controller that modulates a maximum duty cycle of the pulse width modulated signal based on whether or not the transformer is reset, resulting in the switching control signal; and
    an oscillator, coupled to the duty cycle controller, which produces a sawtooth waveform, wherein the duty cycle controller causes a slope of the sawtooth waveform to vary based on whether or not the transformer is reset, and the oscillator produces a signal to vary the maximum duty cycle of the pulse width modulated signal based on the slope of the sawtooth waveform and a reference voltage provided by the duty cycle controller.

2. The apparatus of claim 1, wherein the switch is a transistor, and the transistor is switched on and off by the switching control signal, which is applied to a control terminal of the transistor.

3. The apparatus of claim 2, wherein the transistor is a field-effect transistor, and the control terminal is a gate terminal.

4. The apparatus of claim 3, further comprising:
    a feedback lead, coupled between the controller and a drain terminal of the field-effect transistor, which enables the controller to sense a drain-source voltage of the field-effect transistor and to determine whether or not the transformer is reset.

5. The apparatus of claim 1, wherein the controller senses whether or not the transformer is reset for each switching cycle.

6. The apparatus of claim 1, wherein the controller further comprises:
    a clock that provides a clock signal at a higher frequency than the switching frequency, wherein the clock signal is provided to the duty cycle controller, enabling the duty cycle controller to modulate the maximum duty cycle to the first limit or the second limit.

7. The apparatus of claim 1, wherein the oscillator produces an alternating waveform that includes a charging portion and a discharging portion, and the duty cycle controller adjusts the slope of the charging portion by adjusting a charging current to charge a capacitance within the oscillator.

8. The apparatus of claim 7, wherein the controller further comprises:
   a comparator that compares the alternating waveform with a first reference voltage, Vhigh, and wherein the duty cycle controller causes the maximum duty cycle of the switching control signal to be varied by adjusting a value of Vhigh.

9. The apparatus of claim 1, further comprising:
   a secondary circuit, coupled to the secondary winding, which produces a regulated output voltage.

10. An apparatus for controlling a power supply that includes an alternating current (AC) voltage source that produces an input voltage, a rectifier, coupled to the AC voltage source, which rectifies the input voltage, resulting in a rectified input voltage, a capacitor, coupled to the rectifier, which smoothes the rectified input voltage, a transformer having a primary winding and a secondary winding, wherein the primary winding is coupled to the capacitor, a secondary circuit, coupled to the secondary winding, which produces a regulated output voltage, and a transistor, coupled to the primary winding, which drives the primary winding and which is responsive to a switching control signal, the apparatus comprising:
   a controller that senses whether or not the transformer is reset and produces the switching control signal at a switching frequency, wherein the switching control signal has a duty cycle that is limited to a first limit when the transformer is not reset, and limited to a second limit when the transformer is reset, and wherein the controller comprises
      an oscillator that produces an alternating waveform at the switching frequency, wherein each cycle of the alternating waveform includes a charging portion and a discharging portion; and
      a duty cycle controller that adjusts a slope of the charging portion based on whether or not the transformer is reset, causing a maximum duty cycle of the switching control signal to be varied; and
   a feedback lead, electrically coupled between the transistor and the controller, which enables the controller to sense whether or not the transformer is reset.

11. The apparatus of claim 10, wherein the duty cycle controller adjusts the slope of the charging portion by adjusting a charging current used to charge a capacitance within the oscillator.

12. The apparatus of claim 10, wherein the controller further comprises:
   a comparator that compares the alternating waveform with a first reference voltage, Vhigh, and wherein the duty cycle controller causes the maximum duty cycle of the switching control signal to be varied by adjusting a value of Vhigh.

13. The apparatus of claim 10, wherein the controller causes a slope of a sawtooth waveform, produced by an oscillator, to vary based on whether or not the transformer is reset, and
   the oscillator produces the sawtooth waveform to vary the maximum duty cycle of the pulse width modulated signal based on the slope of the sawtooth waveform and a reference voltage provided by the duty cycle controller.

14. The apparatus of claim 10, wherein the controller senses whether or not the transformer is reset for each switching cycle.

15. A method for supplying a regulated source of power, the method comprising:
   sensing whether or not a transformer is reset;
   producing a switching control signal at a switching frequency, wherein the switching control signal has a duty cycle that is limited to a first limit when the transformer is not reset, and limited to a second limit when the transformer is reset, wherein producing the switching signal comprises
      providing a clock signal at a higher frequency, wherein the switching frequency is a fraction of the higher frequency,
      producing the switching control signal, using the clock signal, by adjusting the duty cycle to the first limit or the second limit,
      producing an alternating waveform at the switching frequency, wherein each cycle of the alternating waveform includes a charging portion and a discharging portion, and
      adjusting a slope of the charging portion based on whether or not the transformer is reset, causing a maximum duty cycle of the switching control signal to be varied; and
   providing the switching control signal to a switch, which drives a primary winding of the transformer based on the switching control signal.

* * * * *